US009627989B2

(12) United States Patent
Viitanen

(10) Patent No.: US 9,627,989 B2
(45) Date of Patent: Apr. 18, 2017

(54) THREE-LEVEL CONVERTER AND METHOD FOR CONTROLLING THREE-LEVEL CONVERTER

(71) Applicant: ABB Technology Oy, Helsinki (FI)

(72) Inventor: Tero Viitanen, Vantaa (FI)

(73) Assignee: ABB Technology OY (FI)

( * ) Notice: Subject to any disclaimer, the term of this patent is extended or adjusted under 35 U.S.C. 154(b) by 18 days.

(21) Appl. No.: 14/860,031

(22) Filed: Sep. 21, 2015

(65) Prior Publication Data
US 2016/0099654 A1 Apr. 7, 2016

(30) Foreign Application Priority Data

Oct. 1, 2014 (EP) .................................. 14187275

(51) Int. Cl.
*H02M 7/487* (2007.01)
*H02M 5/458* (2006.01)

(52) U.S. Cl.
CPC ......... *H02M 5/4585* (2013.01); *H02M 7/487* (2013.01)

(58) Field of Classification Search
CPC ..... H02M 7/487; H02M 5/4585; H02M 5/458
See application file for complete search history.

(56) References Cited

U.S. PATENT DOCUMENTS

| 6,697,274 | B2* | 2/2004 | Bernet | H02M 7/487 |
| | | | | 363/132 |
| 7,495,938 | B2* | 2/2009 | Wu | H02M 7/487 |
| | | | | 363/172 |
| 9,093,923 | B2* | 7/2015 | Ying | H02M 7/5387 |
| 9,325,252 | B2* | 4/2016 | Narimani | H02M 5/4585 |
| 9,419,541 | B2* | 8/2016 | Yoo | H02M 7/483 |
| 2011/0249479 | A1* | 10/2011 | Capitaneanu | H02M 7/487 |
| | | | | 363/132 |
| 2012/0057380 | A1* | 3/2012 | Abe | H02M 7/487 |
| | | | | 363/62 |

(Continued)

OTHER PUBLICATIONS

European Patent Office, European Search Report issued in European Patent Application No. 14187275.4 dated Apr. 29, 2015, 6 pp.

(Continued)

*Primary Examiner* — Timothy J Dole
*Assistant Examiner* — Sisay G Tiku
(74) *Attorney, Agent, or Firm* — Taft Stettinius & Hollister LLP

(57) ABSTRACT

A three-level converter and a method for controlling a three-level converter, wherein the third (S31, S32, S33), the fourth (S41, S42, S43) and the fifth (S51, S52, S53) controllable semiconductor switch of a switching branch having, out of all the switching branches, the most positive voltage in its alternating current pole (AC1, AC2, AC3) is controlled to be non-conductive for the whole period of time when the switching branch in question has the most positive voltage in its alternating current pole, and the first (S11, S12, S13), the second (S21, S22, S23) and the sixth (S61, S62, S63) controllable semiconductor switch of a switching branch having, out of all the switching branches, the most negative voltage in its alternating current pole is controlled to be non-conductive for the whole period of time when the switching branch in question has the most negative voltage in its alternating current pole.

12 Claims, 4 Drawing Sheets

(56) References Cited

U.S. PATENT DOCUMENTS

| | | | | |
|---|---|---|---|---|
| 2012/0092914 A1* | 4/2012 | Viitanen | ............. | H02M 1/4216 |
| | | | | 363/126 |
| 2012/0320647 A1* | 12/2012 | Viitanen | ............... | H02M 7/162 |
| | | | | 363/126 |
| 2013/0272045 A1* | 10/2013 | Soeiro | ................... | H02M 7/537 |
| | | | | 363/131 |
| 2014/0098587 A1* | 4/2014 | Yatsu | .................... | H02M 7/537 |
| | | | | 363/131 |
| 2014/0268940 A1* | 9/2014 | Viitanen | ............... | H02M 7/797 |
| | | | | 363/50 |
| 2014/0334213 A1* | 11/2014 | Jussila | ................. | H02M 7/483 |
| | | | | 363/132 |
| 2016/0043659 A1* | 2/2016 | Xu | ........................ | H02M 7/487 |
| | | | | 363/131 |
| 2016/0056732 A1* | 2/2016 | Jussila | ................. | H02M 7/537 |
| | | | | 363/131 |

OTHER PUBLICATIONS

Zhang, et al., "Discontinuous PWM Modulation Strategy With Circuit-Level Decoupling Concept of Three-Level Neutral-Point-Clamped (NPC) Inverter", IEEE Transactions on Industrial Electronics, vol. 60, No. 5, May 2013, pp. 1897-1906.

Holmes, et al., "Pulse Width Modulation for Power Converters", IEEE Press, Wiley-Interscience, XP002738326, 2003, pp. 299-311.

Brückner, et al., "The Active NPC Converter and Its Loss-Balancing Control", IEEE Transactions on Industrial Electronics, vol. 52, No. 3, Jun. 2005, pp. 855-868.

* cited by examiner a b

THREE-LEVEL CONVERTER AND METHOD FOR CONTROLLING THREE-LEVEL CONVERTER

FIELD OF THE INVENTION

The invention relates to a three-level converter, and to a method for controlling a three-level converter.

BACKGROUND OF THE INVENTION

Three-level converters are converters that have three DC (Direct Current) poles. In addition to positive and negative DC poles, they have a neutral DC pole. Examples of three-level neutral-point-clamped converters are given in T. Brückner, S. Bernet and H. Güldner, "The Active NPC Converter and Its Loss-Balancing Control", IEEE transactions on industrial electronics, Vol. 52, No. 3, June 2005. In particular, an example of an active three-level neutral-point-clamped (ANPC) converter is given.

FIG. 1 shows an example of a main circuit of a switching branch of an active three-level neutral-point-clamped converter. The switching branch comprises six diodes D1 to D6 and six controllable semiconductor switches S1 to S6. Thus, any of the three DC poles Udc+, Udc−, NP can be connected to the AC (Alternating Current) pole of the switching branch by means of the controllable semiconductor switches S1 to S6 and diodes D1 to D6. A converter comprising one or more switching branches, like that of FIG. 1, may operate as a rectifier or as an inverter. The controllable semiconductor switches S1 to S6 are then controlled according to a control or modulation scheme used.

Typically an ANPC converter is controlled with various PWM (Pulse Width Modulation) methods, in which each active semiconductor switch is controlled pulse-wise into a conducting state. The lengths of such pulses are varied according to the control method such that a desired average voltage is provided to the AC output of the converter, for example. When operating as a mains inverter, this kind of PWM converter typically requires an LCL filter, which filters the PWM frequency signal but lets through the actual effective signal, i.e. the fundamental frequency signal. In this case the resulting mains current and mains voltage are essentially almost sinusoidal. An ANPC converter can transfer power from a DC circuit to an AC network (i.e. operate as an inverter) or from an AC network to a DC circuit (i.e. operate as a rectifier). Because the ANPC converter may provide a current path to the neutral DC pole, it is possible that the potential of the neutral DC pole may shift, if a sum current entering the neutral DC pole deviates from zero. As a result, it may be necessary to balance the potential of the neutral DC pole with a separate regulating circuit and/or algorithm, for example.

A problem related to the above solution based on PWM control is that it requires the use of an LCL filter and a complex regulating circuit for the control of the potential of the neutral DC pole, which make the solution more complex and potentially more expensive.

BRIEF DESCRIPTION OF THE INVENTION

An object of the invention is to provide a method and an apparatus for implementing the method so as to solve or at least alleviate the above problem. The object of the invention is achieved by a three-level converter, a method, and a computer program product that are characterized by what is stated in the independent claims. Preferred embodiments of the invention are described in the dependent claims.

The invention is based on the idea that an ANPC converter, whether operating as a rectifier or as an inverter, is controlled such that the AC poles of the converter are actively connected only to the positive and negative DC poles and never to the neutral DC pole.

The solution of the invention provides the advantage that the use of a separate regulating circuit to balance the potential of the neutral DC pole can be avoided and instead simple balancing resistors can be used instead, if necessary. In addition, an LCL filter is not needed, but a simple L filter may be used instead.

BRIEF DESCRIPTION OF THE FIGURES

The invention will now be explained in greater detail in connection with preferred embodiments and with reference to the attached drawings, in which.

DETAILED DESCRIPTION OF THE INVENTION

The application of the invention is not restricted to any specific system, but it may be applied to various electric systems. In addition, the use of the invention is not restricted to any system utilizing a specific basic frequency or to any specific voltage level.

Figure 1:
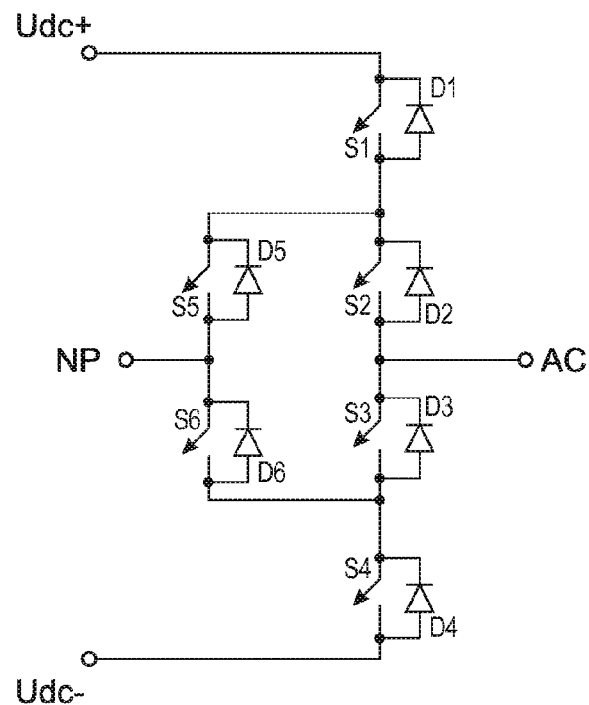
FIG. 1 shows a circuit diagram of a switching branch of a three-level converter according to an embodiment.
Figure 2:
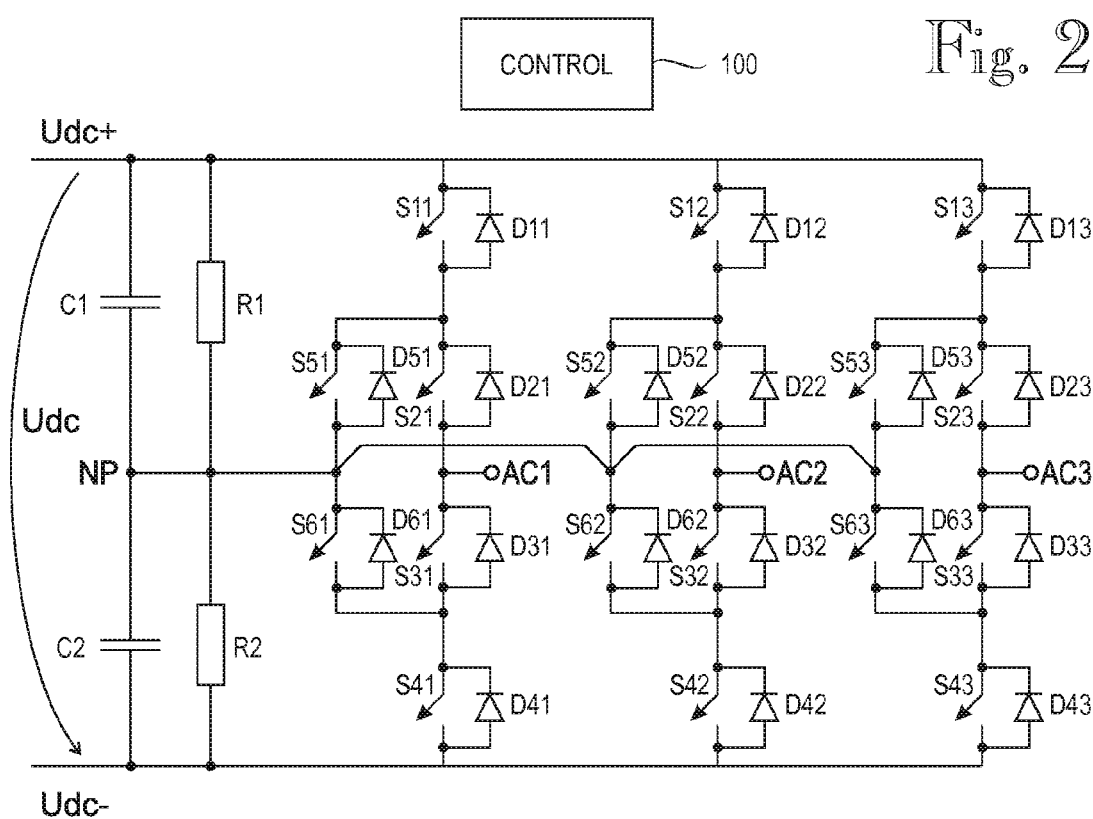
FIG. 2 shows a circuit diagram of a main circuit of a three-phase three-level converter according to an embodiment.

FIG. 2 shows a circuit diagram of a main circuit of a three-phase three-level converter in accordance with an embodiment. It should be noted that the figure only presents elements essential to the understanding of the invention. The converter comprises three switching branches, one for each of the three phases. Such a converter may operate as a rectifier and as an inverter. The converter of FIG. 2 is an ANPC converter and comprises a positive direct current pole Udc+, a negative direct current pole Udc−, and a neutral direct current pole NP. Each switching branch of the converter comprises an alternating current pole AC1, AC2, AC3. Further, each switching branch of the converter comprises a first controllable semiconductor switch S11, S12, S13 and a second controllable semiconductor switch S21, S22, S23 connected in series between the positive direct current pole Udc+ of the converter and the alternating current pole AC1, AC2, AC3 of the switching branch, wherein the first controllable semiconductor switch S11, S12, S13 is connected to the positive direct current pole Udc+. In each switching branch a first diode D11, D12, D13 is connected in parallel to the first controllable semiconductor switch S11, S12, S13 and a second diode D21, D22, D23 is connected in parallel to the second controllable semiconductor switch S21, S22, S23. Further, each switching branch comprises a third controllable semiconductor switch S31, S32, S33 and a fourth controllable semiconductor switch S41, S42, S43 connected in series between the negative direct current pole Udc− of the converter and the alternating current pole AC1, AC2, AC3 of the switching branch, wherein the fourth controllable semiconductor switch S41, S42, S43 is connected to the negative direct current pole Udc−. In each switching branch a third diode D31, D32, D33 is connected in parallel to the third controllable semiconductor switch S31, S32, S33, and a fourth diode D41, D42, D43 is connected in parallel to the fourth controllable semiconductor switch S41, S42, S43. Further, each switching branch of the converter comprises a fifth controllable semiconductor switch S51, S52, S53 connected between the neutral direct current pole NP and a connection point between the first controllable semiconductor switch S11, S12, S13 and the second controllable semiconductor switch S21, S22, S23, and a sixth controllable semiconductor switch S61, S62, S63 connected between the neutral direct current pole NP and a connection point between the third controllable semiconductor switch S31, S32, S33 and the fourth controllable semiconductor switch S41, S42, S43. In each switching branch, a fifth diode D51, D52, D53 is connected in parallel to the fifth controllable semiconductor switch S51, S52, S53 and a sixth diode D61, D62, D63 is connected in parallel to the sixth controllable semiconductor switch S61, S62, S63. The controllable semiconductor switches S11 to S63 can be IGBTs (Insulated Gate Bipolar Transistor) or FETs (Field-Effect Transistor) or any corresponding controllable semiconductor switches. FIG. 2 further shows a control arrangement 100 via which the controllable semiconductor switches S11 to S63 can be controlled. For the sake of clarity, FIG. 2 does not show control connections between the control arrangement 100 and the controllable semiconductor switches S11 to S63, for example. The control of the controllable semiconductor switches can involve one or more additional control components. The exemplary converter of FIG. 2 can further comprise or be connected to a DC intermediate circuit, which can comprise capacitances C1 and C2 connected between the direct current poles of the converter as illustrated. Each of the capacitances C1, C2 can comprise one or more capacitors. The structure of the intermediate circuit could also be different, depending on the circuit configuration used. Moreover, the exemplary converter of FIG. 2 can comprise or be connected to balancing resistances R1 and R2, connected between the direct current poles of the converter as illustrated, for balancing the potential of the neutral direct current pole NP. Each of the resistances R1, R2 can comprise one or more resistors. A suitable value of the balancing resistances R1, R2 depends on circuit characteristics and can vary.

Figure 3:
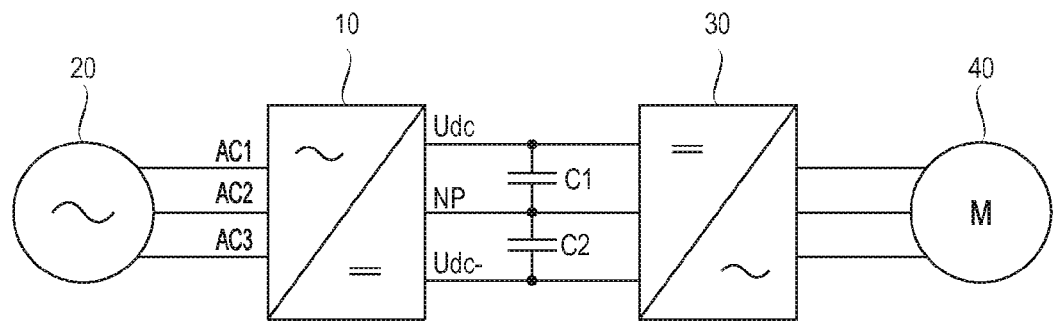
FIG. 3 shows a block diagram of a converter system according to an embodiment.

FIG. 3 shows a block diagram of an exemplary converter system. The exemplary system of FIG. 3 comprises a first converter 10 which corresponds to the three-phase three-level converter of FIG. 2 described above. In the example, the first converter 10 is connected to a three-phase alternating current network 20 via the alternating current poles AC1, AC2, AC3 of the switching branches and to a second converter 30 via at least the positive direct current pole Udc+ and the negative direct current pole Udc− of the first converter and a DC intermediate circuit comprising capacitances C1 and C2. The first converter 10 and the second converter 30 can further have their neutral direct current poles NP connected together, as shown in the example of FIG. 3, provided that they both have such neutral direct current pole. The second converter 30 can be a PWM-controlled three-level converter driving an AC motor 40 (hence operating as an inverter or combined inverter/rectifier) or another kind of load. The second converter 30 could also be a two-level converter. Further, there can also be more than one second converter 30 connected to the first converter 10 via the same DC intermediate circuit, for example. If the at least one second converter 30 is a PWM-controlled three-level converter and the neutral direct current poles of the first converter 10 and the second converter 30 are connected as shown in the example of FIG. 3, it may be possible to omit the balancing resistances R1 and R2 shown in FIG. 2 from the first converter 10, as the second converter may provide for the control of the potential of the neutral direct current pole. FIG. 3 does not show possible filters separately. For example, there may be an L filter connected between the first converter 10 and the alternating current network 20.

In the following, some possible embodiments are provided on how the three-phase three-level converter of FIG. 2 (or the first converter 10 of FIG. 3) can be controlled, when the converter 10 is connected to a three-phase alternating current network 20. The three-phase three-level converter of FIG. 2 (or the first converter 10 of FIG. 3) can operate as a rectifier and as an inverter.

According to an embodiment, when the converter 10 operates as a rectifier (and power thus flows from the AC side of the converter to the DC side of the converter), the third controllable semiconductor switch S31, S32, S33, the fourth controllable semiconductor switch S41, S42, S43 and the fifth controllable semiconductor switch S51, S52, S53 of the switching branch having, out of all the switching branches, the most positive voltage in its alternating current pole AC1, AC2, AC3 are controlled to be non-conductive for the whole period of time when the switching branch in question has the most positive voltage in its alternating current pole, and the first controllable semiconductor switch S11, S12, S13, the second controllable semiconductor switch S21, S22, S23 and the sixth controllable semiconductor switch S61, S62, S63 of the switching branch having, out of all the switching branches, the most negative voltage in its alternating current pole AC1, AC2, AC3 are controlled to be non-conductive for the whole period of time when the switching branch in question has the most negative voltage in its alternating current pole.

In other words, in rectifier operation, always one of the switching branches, namely the one having the most positive (highest) voltage in its alternating current pole AC1, AC2, AC3, out of all the switching branches, is controlled such that the third, fourth, and fifth controllable semiconductor switches are turned OFF as long as the switching branch in question has the most positive voltage in its alternating current pole, whereby the first diode and the second diode of the switching branch in question are conductive through natural commutation and a current may pass from the alternating current pole of the switching branch in question to the positive direct current pole Udc+ of the converter.

In a similar manner, in rectifier operation always one of the switching branches, namely the one having the most negative (lowest) voltage in its alternating current pole AC1, AC2, AC3, out of all the switching branches, is controlled such that the first, second, and sixth controllable semiconductor switches are turned OFF as long as the switching branch in question has the most negative voltage in its alternating current pole, whereby the third diode and the fourth diode of the switching branch in question are conductive through natural commutation and a current may pass from the negative direct current pole Udc− of the converter to the alternating current pole of the switching branch in question.

Figure 6:
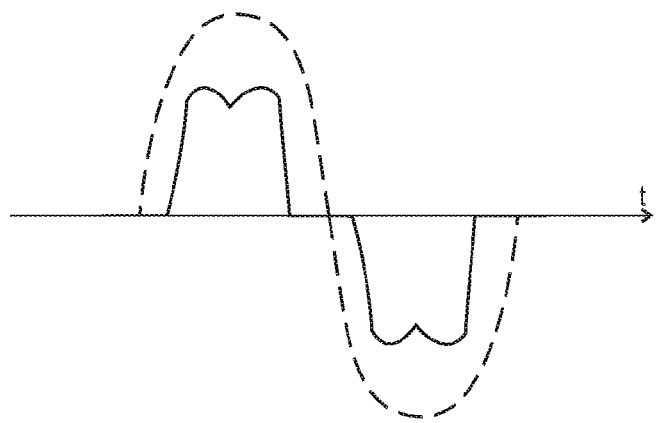
FIG. 6 shows an example of current and voltage waveforms in rectifier operation of a three-level converter according to an embodiment.
Figure 4:
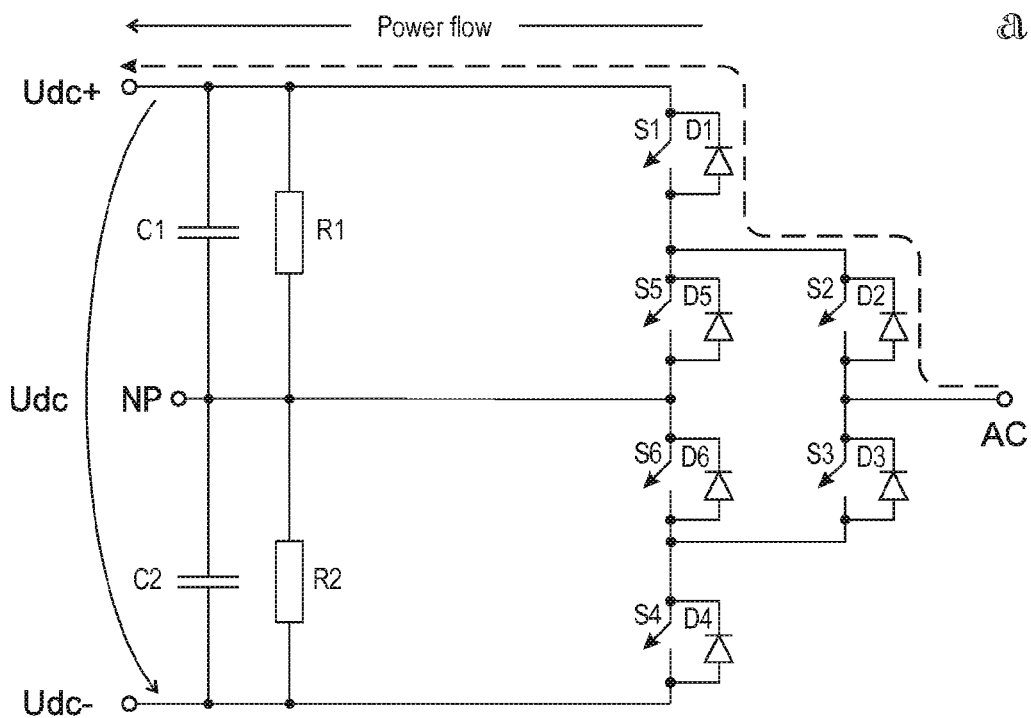
FIG. 4 shows current paths in a switching branch of a three-level converter in rectifier operation according to an embodiment.
Figure 4:
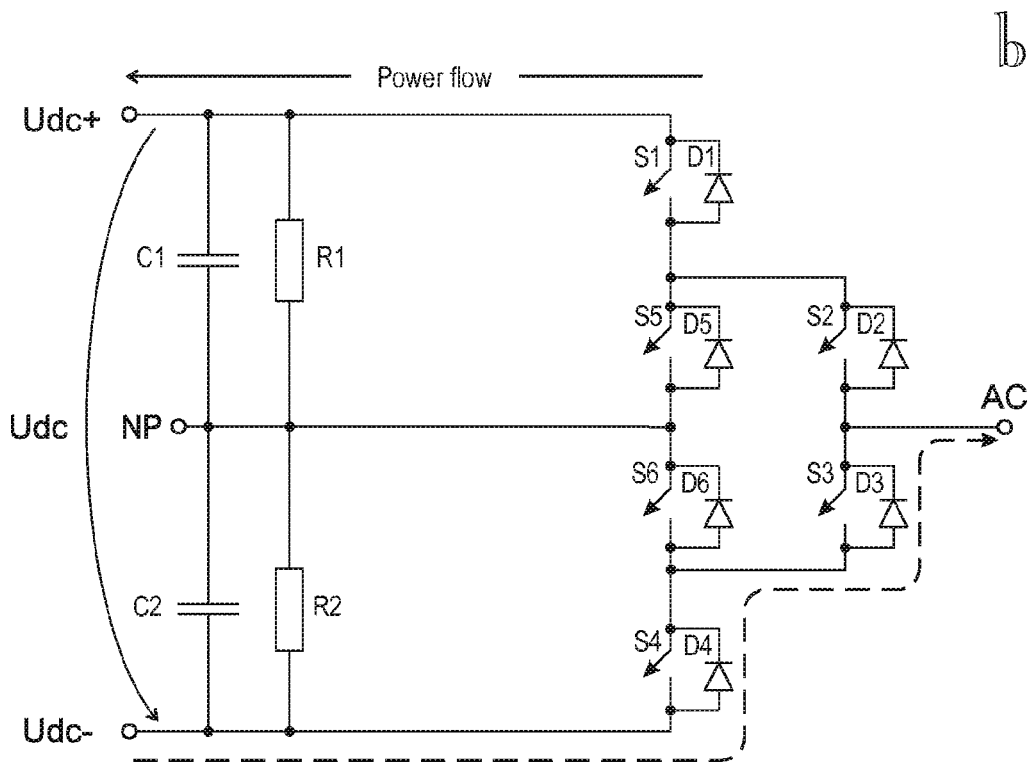

FIG. 4 illustrates current paths in a switching branch of a three-level converter in rectifier operation according to an embodiment. In particular, FIG. 4a) shows, with a broken line arrow, how the current flows from the alternating current pole AC to the positive direct current pole Udc+ via the first diode D1 and the second diode D2 of the switching branch when the switching branch in question has the most positive voltage in its alternating current pole AC. In a similar manner, FIG. 4b) shows, with a broken line arrow, how the current flows from the negative direct current pole Udc− to the alternating current pole AC via the third diode D3 and the fourth diode D4 of the switching branch when the switching branch in question has the most negative voltage in its alternating current pole AC. FIG. 6 shows an example of AC current (solid line) and AC voltage (broken line) waveforms for one AC cycle in a switching branch of a three-level converter in rectifier operation corresponding to the situation of FIG. 4.

According to an embodiment, when the converter 10 operates as an inverter (and power thus flows from the DC side of the converter to the AC side of the converter), the third controllable semiconductor switch S31, S32, S33, the fourth controllable semiconductor switch S41, S42, S43 and the fifth controllable semiconductor switch S51, S52, S53 of the switching branch having, out of all the switching branches, the most positive voltage in its alternating current pole AC1, AC2, AC3 are controlled to be non-conductive for the whole period of time when the switching branch in question has the most positive voltage in its alternating current pole, and the first controllable semiconductor switch S11, S12, S13 and the second controllable semiconductor switch S21, S22, S23 of the switching branch having, out of all the switching branches, the most positive voltage in its alternating current pole AC1, AC2, AC3 are controlled to be conductive for at least part of the period of time when the switching branch in question has the most positive voltage in its alternating current pole. Preferably, the second controllable semiconductor switch is controlled to be conductive before the first controllable semiconductor switch, and the first controllable semiconductor switch is controlled to be non-conductive before the second controllable semiconductor switch. Moreover, the first controllable semiconductor switch S11, S12, S13, the second controllable semiconductor switch S21, S22, S23, and the sixth controllable semiconductor switch S61, S62, S63 of the switching branch having, out of all the switching branches, the most negative voltage in its alternating current pole AC1, AC2, AC3 are controlled to be non-conductive for the whole period of time when the switching branch in question has the most negative voltage in its alternating current pole, and the third controllable semiconductor switch S31, S32, S33 and the fourth controllable semiconductor switch S41, S42, S43 of the switching branch having, out of all the switching branches, the most negative voltage in its alternating current pole AC1, AC2, AC3 are controlled to be conductive for at least part of the period of time when the switching branch in question has the most negative voltage in its alternating current pole. Preferably, the third controllable semiconductor switch is controlled to be conductive before the fourth controllable semiconductor switch, and the fourth controllable semiconductor switch is controlled to be non-conductive before the third controllable semiconductor switch.

In other words, in inverter operation, where power flows from the DC side of the converter to the AC side of the converter, always one of the switching branches, namely the one having the most positive voltage in its alternating current pole AC1, AC2, AC3, out of all the switching branches, is controlled such that the third, fourth, and fifth controllable semiconductor switches are turned OFF as long as the switching branch in question has the most positive voltage in its alternating current pole. In addition, the first and second controllable semiconductor switches of the switching branch in question are turned ON for at least a portion of the time during which the switching branch in question has the most positive voltage in its alternating current pole, whereby a current may pass from the positive direct current pole Udc+ of the converter to the alternating current pole of the switching branch in question through the first and second controllable semiconductor switches of the switching branch in question. The first and second controllable semiconductor switches of the switching branch in question may be turned ON for the whole period of time, when the switching branch in question has the most positive voltage in its alternating current pole, or only for a portion thereof or for longer than said period. In particular, the first and second controllable semiconductor switches of the switching branch in question may be turned ON only for such a period of time that is required to discharge the energy from the DC side of the converter to the AC side of the converter and that may be less than the period of time when the switching branch in question has the most positive voltage in its alternating current pole. It is also possible to turn ON the first and second controllable semiconductor switches of the switching branch in question slightly before the switching branch in question has the most positive voltage in its alternating current pole, which may enhance the commutation between the semiconductor switches. Such a possible time advance in turning ON the first and second controllable semiconductor switches may be constant or variable depending on the characteristics of the system.

In a similar manner, in inverter operation, always one of the switching branches, namely the one having the most negative voltage in its alternating current pole AC1, AC2, AC3, out of all the switching branches, is controlled such that the first, second, and sixth controllable semiconductor switches are turned OFF as long as the switching branch in question has the most negative voltage in its alternating current pole. In addition, the third and fourth controllable semiconductor switches of the switching branch in question are turned ON for at least a portion of the time during which the switching branch in question has the most negative voltage in its alternating current pole, whereby a current may pass from the alternating current pole of the switching branch in question to the negative direct current pole Udc− of the converter through the third and fourth controllable semiconductor switches of the switching branch in question. The third and fourth controllable semiconductor switches of the switching branch in question may be turned ON for the whole period of time, when the switching branch in question has the most negative voltage in its alternating current pole, or only for a portion thereof or for longer than said period. In particular, the third and fourth controllable semiconductor switches of the switching branch in question may be turned ON only for such a period of time that is required to discharge the energy from the DC side of the converter to the AC side of the converter and that may be less than the period of time when the switching branch in question has the most negative voltage in its alternating current pole. It is also possible to turn ON the third and fourth controllable semiconductor switches of the switching branch in question slightly before the switching branch in question has the most negative voltage in its alternating current pole, which may enhance the commutation between the semiconductor switches. Such a possible time advance in turning ON the third and fourth controllable semiconductor switches may be constant or variable depending on the characteristics of the system.

Figure 7:
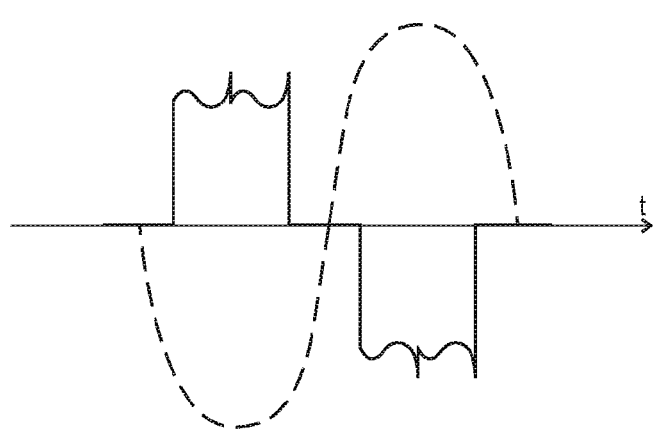
FIG. 7 shows an example of current and voltage waveforms in inverter operation of a three-level converter according to an embodiment.
Figure 5:
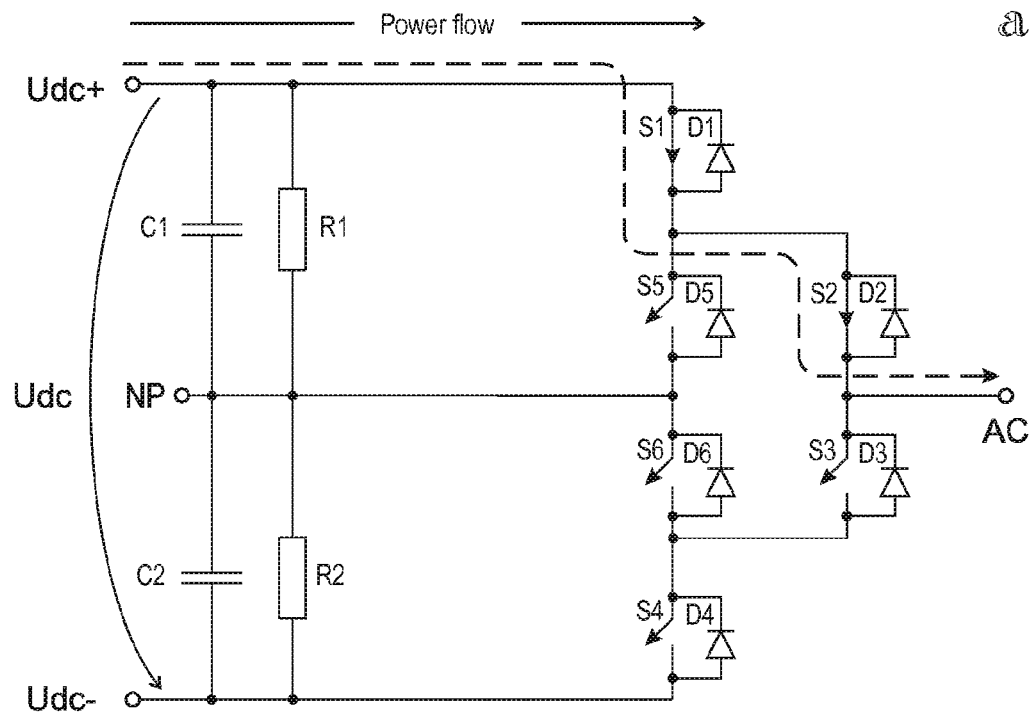
FIG. 5 shows current paths in a switching branch of a three-level converter in inverter operation according to an embodiment.
Figure 5:
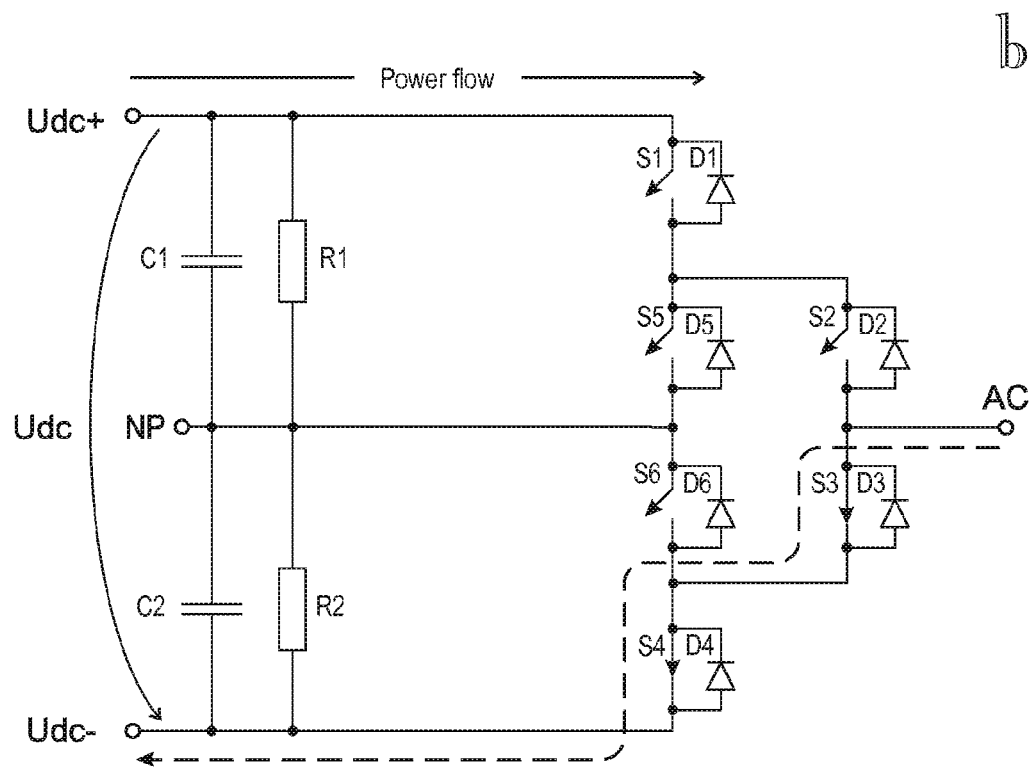

FIG. 5 illustrates current paths in a switching branch of a three-level converter in inverter operation according to an embodiment. In particular, FIG. 5a) shows, with a broken line arrow, how the current flows from the positive direct current pole Udc+ to the alternating current pole AC via the first controllable semiconductor switch S1 and the second controllable semiconductor switch S2 of the switching branch when the switching branch in question has the most positive voltage in its alternating current pole AC. In a similar manner, FIG. 5b) shows, with a broken line arrow, how the current flows from the alternating current pole AC to the negative direct current pole Udc– via the third controllable semiconductor switch S3 and the fourth controllable semiconductor switch S4 of the switching branch when the switching branch in question has the most negative voltage in its alternating current pole AC. FIG. 7 shows an example of AC current (solid line) and AC voltage (broken line) waveforms for one AC cycle in a switching branch of a three-level converter in an inverter operation corresponding to the situation of FIG. 5.

According to an embodiment, when the converter operates as a rectifier according to any embodiment described herein, the first controllable semiconductor switch S11, S12, S13 and the second controllable semiconductor switch S21, S22, S23 of the switching branch having, out of all the switching branches, the most positive voltage in its alternating current pole AC1, AC2, AC3 may further be controlled to be conductive for the whole period of time when the switching branch in question has the most positive voltage in its alternating current pole. Moreover, the third controllable semiconductor switch S31, S32, S33 and the fourth controllable semiconductor switch S41, S42, S43 of the switching branch having, out of all the switching branches, the most negative voltage in its alternating current pole AC1, AC2, AC3 may further be controlled to be conductive for the whole period of time when the switching branch in question has the most negative voltage in its alternating current pole. This embodiment provides the advantage that a current path can be guaranteed in a synchronized manner regardless of the direction of the power flow.

According to an embodiment, when the converter operates as a rectifier according to any embodiment described herein, the sixth controllable semiconductor switch S61, S62, S63 of the switching branch having, out of all the switching branches, the most positive voltage in its alternating current pole AC1, AC2, AC3 may further be controlled to be conductive for the whole period of time when the switching branch in question has the most positive voltage in its alternating current pole. This provides the advantage that a voltage stress across the non-conducting third controllable semiconductor switch, third diode, fourth controllable semiconductor switch, and fourth diode can be brought to an even value Udc/2, because the neutral direct current pole NP is connected to the connection point between these components. Moreover, the fifth controllable semiconductor switch S51, S52, S53 of the switching branch having, out of all the switching branches, the most negative voltage in its alternating current pole AC1, AC2, AC3 may further be controlled to be conductive for the whole period of time when the switching branch in question has the most negative voltage in its alternating current pole. This provides the advantage that a voltage stress across the non-conducting first controllable semiconductor switch, first diode, second controllable semiconductor switch, and second diode can be brought to an even value Udc/2, because the neutral direct current pole NP is connected to the connection point between these components. Such voltage-balancing connections do not change the potential of the neutral direct current pole NP because essentially no power/current is transmitted.

According to an embodiment, when the converter operates as an inverter according to any embodiment described herein, the sixth controllable semiconductor switch S61, S62, S63 of the switching branch having, out of all the switching branches, the most positive voltage in its alternating current pole AC1, AC2, AC3 may further be controlled to be conductive for the whole period of time when the switching branch in question has the most positive voltage in its alternating current pole. This provides the advantage that a voltage stress across the non-conducting third controllable semiconductor switch, third diode, fourth controllable semiconductor switch, and fourth diode can be brought to an even value Udc/2, because the neutral direct current pole NP is connected to the connection point between these components. Moreover, the fifth controllable semiconductor switch S51, S52, S53 of the switching branch having, out of all the switching branches, the most negative voltage in its alternating current pole AC1, AC2, AC3 may further be controlled to be conductive for the whole period of time when the switching branch in question has the most negative voltage in its alternating current pole. This provides the advantage that a voltage stress across the non-conducting first controllable semiconductor switch, first diode, second controllable semiconductor switch, and second diode can be brought to an even value Udc/2, because the neutral direct current pole NP is connected to the connection point between these components. Such voltage balancing connections do not change the potential of the neutral direct current pole NP, because essentially no power/current is transmitted.

The control of the controllable semiconductor switches according to the various embodiments described herein can be performed by or via the control arrangement 100. It is also possible to use additional or separate logical or physical units (not shown) for performing the control functionality of the various embodiments. The control arrangement 100 is preferably able to directly or via further control devices, such as driver circuits, control the controllable semiconductor switches. Moreover, the control arrangement preferably obtains, directly or via suitable measuring arrangements, for example, the voltages of the alternating current poles in order to perform the various embodiments.

The control arrangement 100 controlling the controllable semiconductor switches according to any one of the embodiments, or a combination thereof, can be implemented as one unit or as two or more separate units that are configured to implement the functionality of the various embodiments. Here the term 'unit' refers generally to a physical or logical entity, such as a physical device or a part thereof or a software routine. The control arrangement 100 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a CPU control unit. The CPU control unit is controlled by a sequence of program instructions transferred to the CPU from the RAM. The CPU control unit may contain a number of microinstructions for basic operations. The implementation of the microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control data. It is also possible to use analog circuits, programmable logic devices (PLD) or discrete electric components and devices for implementing the functionality according to any one of the embodiments. For example, the control arrangement 100 according to any one of the embodiments may be implemented at least partly by means of such analog circuits or programmable logic devices.

The invention can be implemented in existing system elements or by using separate dedicated elements or devices in a centralized or distributed manner. Present converters, for example, can comprise programmable logic devices or processors and memory that can be utilized in the functions according to embodiments of the invention. Thus, all modifications and configurations required for implementing an embodiment of the invention e.g. in existing converters may be performed as software routines, which may be implemented as added or updated software routines. If at least part of the functionality of the invention is implemented by software, such software can be provided as a computer program product comprising computer program code which, when run on a computer, causes the computer or a corresponding arrangement to perform the functionality according to the invention as described above. Such a computer program code may be stored or generally embodied on a computer readable medium, such as a suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that, as technology advances, the basic idea of the invention may be implemented in various ways. The invention and its embodiments are thus not restricted to the above examples but may vary within the scope of the claims.

The invention claimed is:

1. A three-level converter comprising three switching branches, each switching branch comprising:
   a first controllable semiconductor switch and a second controllable semiconductor switch connected in series between a positive direct current pole of the converter and an alternating current pole of the switching branch, wherein the first controllable semiconductor switch is connected to the positive direct current pole of the converter;
   a first diode connected in parallel to the first controllable semiconductor switch, and a second diode connected in parallel to the second controllable semiconductor switch;
   a third controllable semiconductor switch and a fourth controllable semiconductor switch connected in series between a negative direct current pole of the converter and the alternating current pole of the switching branch, wherein the fourth controllable semiconductor switch is connected to the negative direct current pole of the converter;
   a third diode connected in parallel to the third controllable semiconductor switch, and a fourth diode connected in parallel to the fourth controllable semiconductor switch;
   a fifth controllable semiconductor switch connected between a neutral direct current pole of the converter and a connection point between the first and second controllable semiconductor switches;
   a sixth controllable semiconductor switch connected between the neutral direct current pole of the converter and a connection point between the third and fourth controllable semiconductor switches; and
   a fifth diode connected in parallel to the fifth controllable semiconductor switch, and a sixth diode connected in parallel to the sixth controllable semiconductor switch; and
   means for controlling the controllable semiconductor switches, wherein
   a) the means for controlling the controllable semiconductor switches are configured to, when the converter is connected to a three-phase alternating current network via the alternating current poles of the switching branches and the converter operates as a rectifier:
   control the third controllable semiconductor switch, the fourth controllable semiconductor switch and the fifth controllable semiconductor switch of the switching branch having, out of all the switching branches, the most positive voltage in its alternating current pole to be non-conductive for the whole period of time when the switching branch in question has the most positive voltage in its alternating current pole; and
   control the first controllable semiconductor switch, the second controllable semiconductor switch and the sixth controllable semiconductor switch of the switching branch having, out of all the switching branches, the most negative voltage in its alternating current pole to be non-conductive for the whole period of time when the switching branch in question has the most negative voltage in its alternating current pole,
   and wherein
   b) the means for controlling the controllable semiconductor switches are configured to, when the converter is connected to a three-phase alternating current network via the alternating current poles of the switching branches and the converter operates as an inverter:
   control the third controllable semiconductor switch, the fourth controllable semiconductor switch and the fifth controllable semiconductor switch of the switching branch having, out of all the switching branches, the most positive voltage in its alternating current pole to be non-conductive for the whole period of time when the switching branch in question has the most positive voltage in its alternating current pole, and control the first controllable semiconductor switch and the second controllable semiconductor switch of the switching branch having, out of all the switching branches, the most positive voltage in its alternating current pole to be conductive for at least part of the period of time when the switching branch in question has the most positive voltage in its alternating current pole; and control the first controllable semiconductor switch, the second controllable semiconductor switch and the sixth controllable semiconductor switch of the switching branch having, out of all the switching branches, the most negative voltage in its alternating current pole to be non-conductive for the whole period of time when the switching branch in question has the most negative voltage in its alternating current pole, and control the third controllable semiconductor switch and the fourth controllable semiconductor switch of the switching branch having, out of all the switching branches, the most negative voltage in its alternating current pole to be conductive for at least part of the period of time when the switching branch in question has the most negative voltage in its alternating current pole.

2. The three-level converter of claim 1, wherein, as per alternative a), the means for controlling the controllable semiconductor switches are further configured to:

control the first controllable semiconductor switch and the second controllable semiconductor switch of the switching branch having, out of all the switching branches, the most positive voltage in its alternating current pole to be conductive for the whole period of time when the switching branch in question has the most positive voltage in its alternating current pole; and control the third controllable semiconductor switch and the fourth controllable semiconductor switch of the switching branch having, out of all the switching branches, the most negative voltage in its alternating current pole to be conductive for the whole period of time when the switching branch in question has the most negative voltage in its alternating current pole.

3. The three-level converter according to claim 1, wherein, as per alternative a), the means for controlling the controllable semiconductor switches are further configured to:

control the sixth controllable semiconductor switch of the switching branch having, out of all the switching branches, the most positive voltage in its alternating current pole to be conductive for the whole period of time when the switching branch in question has the most positive voltage in its alternating current pole; and control the fifth controllable semiconductor switch of the switching branch having, out of all the switching branches, the most negative voltage in its alternating current pole to be conductive for the whole period of time when the switching branch in question has the most negative voltage in its alternating current pole.

4. The three-level converter according to claim 1, wherein, as per alternative b), the means for controlling the controllable semiconductor switches are further configured to:

control the sixth controllable semiconductor switch of the switching branch having, out of all the switching branches, the most positive voltage in its alternating current pole to be conductive for the whole period of time when the switching branch in question has the most positive voltage in its alternating current pole; and control the fifth controllable semiconductor switch of the switching branch having, out of all the switching branches, the most negative voltage in its alternating current pole to be conductive for the whole period of time when the switching branch in question has the most negative voltage in its alternating current pole.

5. The three-level converter according to claim 1, wherein, as per alternative b), the means for controlling the controllable semiconductor switches are further configured to:

control the second controllable semiconductor switch to be conductive before the first controllable semiconductor switch, and control the first controllable semiconductor switch to be non-conductive before the second controllable semiconductor switch; and control the third controllable semiconductor switch to be conductive before the fourth controllable semiconductor switch, and control the fourth controllable semiconductor switch to be non-conductive before the third controllable semiconductor switch.

6. A method for controlling a three-level converter comprising three switching branches, each switching branch comprising:

a first controllable semiconductor switch and a second controllable semiconductor switch connected in series between a positive direct current pole of the converter and an alternating current pole of the switching branch, wherein the first controllable semiconductor switch is connected to the positive direct current pole of the converter;

a first diode connected in parallel to the first controllable semiconductor switch, and a second diode connected in parallel to the second controllable semiconductor switch;

a third controllable semiconductor switch and a fourth controllable semiconductor switch connected in series between a negative direct current pole of the converter and the alternating current pole of the switching branch, wherein the fourth controllable semiconductor switch is connected to the negative direct current pole of the converter;

a third diode connected in parallel to the third controllable semiconductor switch, and a fourth diode connected in parallel to the fourth controllable semiconductor switch;

a fifth controllable semiconductor switch connected between a neutral direct current pole of the converter and a connection point between the first and second controllable semiconductor switches;

a sixth controllable semiconductor switch connected between the neutral direct current pole of the converter and a connection point between the third and fourth controllable semiconductor switches; and a fifth diode connected in parallel to the fifth controllable semiconductor switch, and a sixth diode connected in parallel to the sixth controllable semiconductor switch, wherein the method comprises:

a) when the converter is connected to a three-phase alternating current network via the alternating current poles of the switching branches and the converter operates as a rectifier:

controlling the third controllable semiconductor switch, the fourth controllable semiconductor switch, and the fifth controllable semiconductor switch of the switching branch having, out of all the switching branches, the most positive voltage in its alternating current pole to be non-conductive for the whole period of time when the switching branch in question has the most positive voltage in its alternating current pole; and controlling the first controllable semiconductor switch, the second controllable semiconductor switch, and the sixth controllable semiconductor switch of the switching branch having, out of all the switching branches, the most negative voltage in its alternating current pole to be non-conductive for the whole period of time when the switching branch in question has the most negative voltage in its alternating current pole, and b) when the converter is connected to a three-phase alternating current network via the alternating current poles of the switching branches and the converter operates as an inverter:

controlling the third controllable semiconductor switch, the fourth controllable semiconductor switch, and the fifth controllable semiconductor switch of the switching branch having, out of all the switching branches, the most positive voltage in its alternating current pole to be non-conductive for the whole period of time when the switching branch in question has the most positive voltage in its alternating current pole, and control the first controllable semiconductor switch and the second controllable semiconductor switch of the switching branch having, out of all the switching branches, the most positive voltage in its alternating current pole to be conductive for at least part of the period of time when the switching branch in question has the most positive voltage in its alternating current pole; and controlling the first controllable semiconductor switch, the second controllable semiconductor switch, and the sixth controllable semiconductor switch of the switching branch having, out of all the switching branches, the most negative voltage in its alternating current pole to be non-conductive for the whole period of time when the switching branch in question has the most negative voltage in its alternating current pole, and control the third controllable semiconductor switch and the fourth controllable semiconductor switch of the switching branch having, out of all the switching branches, the most negative voltage in its alternating current pole to be conductive for at least part of the period of time when the switching branch in question has the most negative voltage in its alternating current pole.

7. The method of claim 6, wherein, as per alternative a), the method further comprises:

controlling the first controllable semiconductor switch and the second controllable semiconductor switch of the switching branch having, out of all the switching branches, the most positive voltage in its alternating current pole to be conductive for the whole period of time when the switching branch in question has the most positive voltage in its alternating current pole; and controlling the third controllable semiconductor switch and the fourth controllable semiconductor switch of the switching branch having, out of all the switching branches, the most negative voltage in its alternating current pole to be conductive for the whole period of time when the switching branch in question has the most negative voltage in its alternating current pole.

8. The method of claim 6, wherein, as per alternative a), the method further comprises:

controlling the sixth controllable semiconductor switch of the switching branch having, out of all the switching branches, the most positive voltage in its alternating current pole to be conductive for the whole period of time when the switching branch in question has the most positive voltage in its alternating current pole; and controlling the fifth controllable semiconductor switch of the switching branch having, out of all the switching branches, the most negative voltage in its alternating current pole to be conductive for the whole period of time when the switching branch in question has the most negative voltage in its alternating current pole.

9. The method of claim 6, wherein, as per alternative b), the method further comprises:

controlling the sixth controllable semiconductor switch of the switching branch having, out of all the switching branches, the most positive voltage in its alternating current pole to be conductive for the whole period of time when the switching branch in question has the most positive voltage in its alternating current pole; and controlling the fifth controllable semiconductor switch of the switching branch having, out of all the switching branches, the most negative voltage in its alternating current pole to be conductive for the whole period of time when the switching branch in question has the most negative voltage in its alternating current pole.

10. The method of claim 6, wherein, as per alternative b), the second controllable semiconductor switch is controlled to be conductive before the first controllable semiconductor switch, and the first controllable semiconductor switch is controlled to be non-conductive before the second controllable semiconductor switch; and the third controllable semiconductor switch is controlled to be conductive before the fourth controllable semiconductor switch, and the fourth controllable semiconductor switch is controlled to be non-conductive before the third controllable semiconductor switch.

11. A computer program product comprising computer program code embodied on a non-transitory computer readable medium, wherein execution of the program code on a computer causes the computer to carry out the steps of the method according to claim 6.

12. A three-level converter comprising three switching branches, each switching branch comprising:

a first controllable semiconductor switch and a second controllable semiconductor switch connected in series between a positive direct current pole of the converter and an alternating current pole of the switching branch, wherein the first controllable semiconductor switch is connected to the positive direct current pole of the converter;

a first diode connected in parallel to the first controllable semiconductor switch, and a second diode connected in parallel to the second controllable semiconductor switch;

a third controllable semiconductor switch and a fourth controllable semiconductor switch connected in series between a negative direct current pole of the converter and the alternating current pole of the switching branch, wherein the fourth controllable semiconductor switch is connected to the negative direct current pole of the converter;

a third diode connected in parallel to the third controllable semiconductor switch, and a fourth diode connected in parallel to the fourth controllable semiconductor switch;

a fifth controllable semiconductor switch connected between a neutral direct current pole of the converter and a connection point between the first and second controllable semiconductor switches;

a sixth controllable semiconductor switch connected between the neutral direct current pole of the converter and a connection point between the third and fourth controllable semiconductor switches; and a fifth diode connected in parallel to the fifth controllable semiconductor switch, and a sixth diode connected in parallel to the sixth controllable semiconductor switch; and a control arrangement for controlling the controllable semiconductor switches, the control arrangement comprising a processor and a memory storing instructions that, when executed by the processor, cause the control arrangement to:

a) when the converter is connected to a three-phase alternating current network via the alternating current poles of the switching branches and the converter operates as a rectifier:

control the third controllable semiconductor switch, the fourth controllable semiconductor switch and the fifth controllable semiconductor switch of the switching branch having, out of all the switching branches, the most positive voltage in its alternating current pole to be non-conductive for the whole period of time when the switching branch in question has the most positive voltage in its alternating current pole; and control the first controllable semiconductor switch, the second controllable semiconductor switch and the sixth controllable semiconductor switch of the switching branch having, out of all the switching branches, the most negative voltage in its alternating current pole to be non-conductive for the whole period of time when the switching branch in question has the most negative voltage in its alternating current pole, and b) when the converter is connected to a three-phase alternating current network via the alternating current poles of the switching branches and the converter operates as an inverter:

control the third controllable semiconductor switch, the fourth controllable semiconductor switch and the fifth controllable semiconductor switch of the switching branch having, out of all the switching branches, the most positive voltage in its alternating current pole to be non-conductive for the whole period of time when the switching branch in question has the most positive voltage in its alternating current pole, and control the first controllable semiconductor switch and the second controllable semiconductor switch of the switching branch having, out of all the switching branches, the most positive voltage in its alternating current pole to be conductive for at least part of the period of time when the switching branch in question has the most positive voltage in its alternating current pole; and control the first controllable semiconductor switch, the second controllable semiconductor switch and the sixth controllable semiconductor switch of the switching branch having, out of all the switching branches, the most negative voltage in its alternating current pole to be non-conductive for the whole period of time when the switching branch in question has the most negative voltage in its alternating current pole, and control the third controllable semiconductor switch and the fourth controllable semiconductor switch of the switching branch having, out of all the switching branches, the most negative voltage in its alternating current pole to be conductive for at least part of the period of time when the switching branch in question has the most negative voltage in its alternating current pole.

* * * * *